US008271786B1

(12) United States Patent
Pradhan et al.

(10) Patent No.: US 8,271,786 B1
(45) Date of Patent: Sep. 18, 2012

(54) METHOD AND SYSTEM FOR PROVIDING SECURE COMMUNICATIONS BETWEEN A FIRST AND A SECOND PEER DEVICE

(75) Inventors: Salil Vjaykumar Pradhan, Santa Clara, CA (US); Geoffrey Martin Lyon, Menlo Park, CA (US); Bill Serra, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1570 days.

(21) Appl. No.: 10/271,662

(22) Filed: Oct. 16, 2002

(51) Int. Cl.
*H04L 9/00* (2006.01)
*H04K 1/00* (2006.01)

(52) U.S. Cl. .................................. 713/169; 713/168

(58) Field of Classification Search .............. 455/426.2; 725/81; 380/273; 713/169, 168
See application file for complete search history.

(56) References Cited

U.S. PATENT DOCUMENTS

| | | | | |
|---|---|---|---|---|
| 5,359,182 A * | 10/1994 | Schilling | .................. | 235/380 |
| 5,412,192 A * | 5/1995 | Hoss | .................. | 235/380 |
| 5,521,363 A * | 5/1996 | Tannenbaum | .................. | 235/379 |
| 5,585,789 A * | 12/1996 | Haneda | .................. | 340/825.52 |
| 5,761,421 A | 6/1998 | van Hoff et al. | | |
| 6,105,006 A * | 8/2000 | Davis et al. | .................. | 705/35 |
| 6,766,453 B1 * | 7/2004 | Nessett et al. | .................. | 713/171 |
| 6,928,295 B2 * | 8/2005 | Olson et al. | .................. | 455/522 |
| 6,980,812 B1 * | 12/2005 | Sandhu et al. | .................. | 455/456.1 |
| 2002/0010515 A1 * | 1/2002 | Fukuoka et al. | .................. | 700/9 |
| 2002/0094840 A1 * | 7/2002 | Hattori et al. | .................. | 455/558 |
| 2002/0194500 A1 * | 12/2002 | Bajikar | .................. | 713/201 |
| 2003/0050041 A1 * | 3/2003 | Wu | .................. | 455/406 |
| 2003/0060168 A1 * | 3/2003 | Teibel | .................. | 455/69 |
| 2003/0083026 A1 * | 5/2003 | Liu | .................. | 455/127 |
| 2003/0087681 A1 * | 5/2003 | Sackett et al. | .................. | 455/574 |
| 2003/0149874 A1 * | 8/2003 | Balfanz et al. | .................. | 713/168 |
| 2003/0220114 A1 * | 11/2003 | Langensteiner et al. | .................. | 455/450 |
| 2004/0054897 A1 * | 3/2004 | Dawson et al. | .................. | 713/168 |

OTHER PUBLICATIONS

Bisdikian, C., "An Overview of the Bluetooth Wireless Technology", Jun. 6, 2001, <http://cnscenter.future.co.kr/resource/hot-topic/wpan/RC22109.pdf> retrieved online Dec. 18, 2006, pp. 1-31.*

* cited by examiner

*Primary Examiner* — Christopher Brown

(57) ABSTRACT

A method and system for providing secure communications between a first and second peer device is disclosed. The invention includes allowing the first and second peer devices to verify the authenticity of each other only while each peer device is within an established zone of privacy wherein the established zone of privacy is an area close (for example, almost touching) to the peer device. Because the authenticity of the other device is verified only while each peer device is within the established zone of privacy, users can visually confirm that there are no potential interlopers within the zone. As a result, the two peer devices can discover each other in a more secure fashion The method and system include creating a zone of privacy with the first peer device, allowing the first and second peer devices to verify the authenticity of each other only while the second peer device is within the zone of privacy, and allowing encrypted data to transfer between the first and second peer device once the authenticity of each peer device has been verified.

28 Claims, 9 Drawing Sheets

US 8,271,786 B1

METHOD AND SYSTEM FOR PROVIDING SECURE COMMUNICATIONS BETWEEN A FIRST AND A SECOND PEER DEVICE

FIELD OF INVENTION

The present invention relates generally to the field of secure key cryptography and more particularly to a method and system for providing secure communications between a first and a second peer device.

BACKGROUND OF THE INVENTION

Establishing a peer-to-peer (P2P) connection over a commercial telecommunications network between two peer devices is a common problem in today's computing environment. This also known as device discovery. A number of prior art solutions require the use of several open or "public" keys to allow the two peer devices to discover each other and establish the P2P connection. An encryption method is said to be a public key encryption scheme when, for each associated encryption/decryption pair, one key (the public key) is made publicly available, while the other key (the private key) is kept secret. The following attributes characterize public key encryption: (i) keys are generated in pairs, consisting of a public key and a private key; (ii) there is always a mathematical relationship between the two keys, but this relationship is based on some "hard" problem (i.e. one that cannot be solved in a reasonable amount of time using any computer system currently available); (iii) the private key cannot be derived from its corresponding public key; and (iv) information encrypted in the public key can only be decrypted by its corresponding private key.

Currently, there is no acceptable way for P2P devices to discover each other over a commercial telecommunications network in a secure manner without the separate distribution of a password, key, certificate or token (either through the mail, or a physical third party interaction). This is due to the fact that the commercial telecommunications network is non-secure and subject to compromise by a skilled Interloper.

The difficulty of establishing secure communications under the prior art may be understood by reference to the following assumptions: (1) an Interloper on the network can intercept all communications between a Subscriber and a commercial Provider; (2) the Interloper has all the facilities of the Subscriber, but does not have the facilities of the Provider; (3) the Subscriber (hitherto unknown to the Provider) is responding to the Provider's solicitation, but has no material provided by the Provider; and (4) the Subscriber will attempt to set up a secure account on his first digital contact with the Provider using commercially available software (e.g., off-the-shelf web browser, etc.).

FIG. 1 is an illustration of a typical commercial network environment. FIG. 1 shows a Provider 16 of services and a potential Subscriber 10 of those services connected to a non-secure network 12 in accordance with the foregoing assumptions. More specifically, FIG. 1 shows a call 14 from Subscriber 10 that is sent through Network 12 and received by Provider 16 being intercepted by Interloper 18. FIG. 1 also shows an answer 15 from Provider 16 to Subscriber 10 also being intercepted by Interloper 18. Consequently, the Subscriber 10, believing that he has established a session key with the Provider 16, may have in fact established a session key with the Interloper 18, who is masquerading as the Provider 16.

A conventional way of solving the P2P discovery problem is to use a directional link, such as an Infra-Red (IR) link on both devices, whereby each device discovers the other device via the IR link. Once the two devices discover each other, a key-exchange takes place, and the real data is exchanged either over a secure Radio-Frequency (RF) link established using the IR link or even directly over the IR link. Although the directional nature of IR helps solve the problem, it does not completely eliminate it because eavesdropping is still possible during the key-exchange.

Accordingly, what is needed is a method and system for providing secure communications between first and second data processing devices that addresses the above-outlined problems. The method and system should be simple, cost effective and capable of being easily adapted to existing technology. The presem invention addresses these needs.

SUMMARY OF THE INVENTION

A method and system for providing secure communications between a first and second peer device is disclosed. The invention includes allowing the first and second peer devices to verify the authenticity of each other only while each peer device is within an established zone of privacy wherein the established zone of privacy is an area close (for example, almost touching) to the peer device. Because the authenticity of the other device is verified only while each peer device is within the established zone of privacy, users can visually confirm that there are no potential interlopers within the zone. As a result, the two peer devices can discover each other in a more secure fashion.

A first aspect of the present invention is a method and system for providing secure communications between a first and second peer device. The method and system include creating a zone of privacy with the first peer device, allowing the first and second peer devices to verify the authenticity of each other only while the second peer device is within the zone of privacy, and allowing encrypted data to transfer between the first and second peer device once the authenticity of each peer device has been verified.

Another aspect of the present invention is a peer device. The peer device comprises means for creating a zone of privacy, means for allowing the peer device to verify the authenticity of another peer device only while the another peer device is within the zone of privacy and means for transferring encrypted data to the another peer device once the authenticity of the another peer device is verified.

Other aspects and advantages of the present invention will become apparent from the following detailed description, taken in conjunction with the accompanying drawings, illustrating by way of example the principles of the invention.

DETAILED DESCRIPTION OF THE INVENTION

The present invention relates to a method and system for providing secure communications between a first and second peer device. The following description is presented to enable one of ordinary skill in the art to make and use the invention and is provided in the context of a patent application and its requirements. Various modifications to the embodiments and the generic principles and features described herein will be readily apparent to those skilled in the art. Thus, the present invention is not intended to be limited to the embodiments shown but is to be accorded the widest scope consistent with the principles and features described herein.

For the purposes of this patent application, a peer device is defined as a functional device that is on the same protocol layer as another device and is capable of communicating with the another device in a peer-to-peer fashion. Accordingly, one of ordinary skill in the art will readily recognize that a peer device, as utilized in conjunction with the present invention, could include a personal-digital-assistant (PDA), a mobile phone, a laptop computer or a variety of other devices while remaining within the spirit and scope of the present invention.

Figure 1:
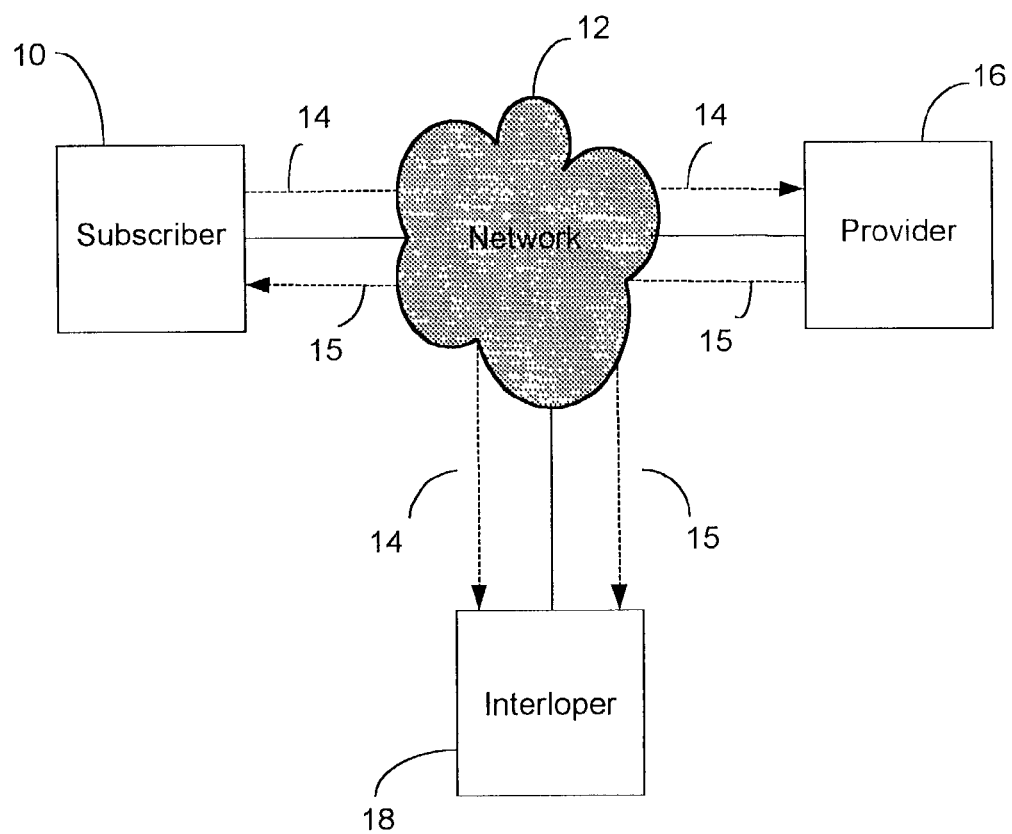
FIG. 1 is an illustration of typical commercial network environment.
Figure 2:
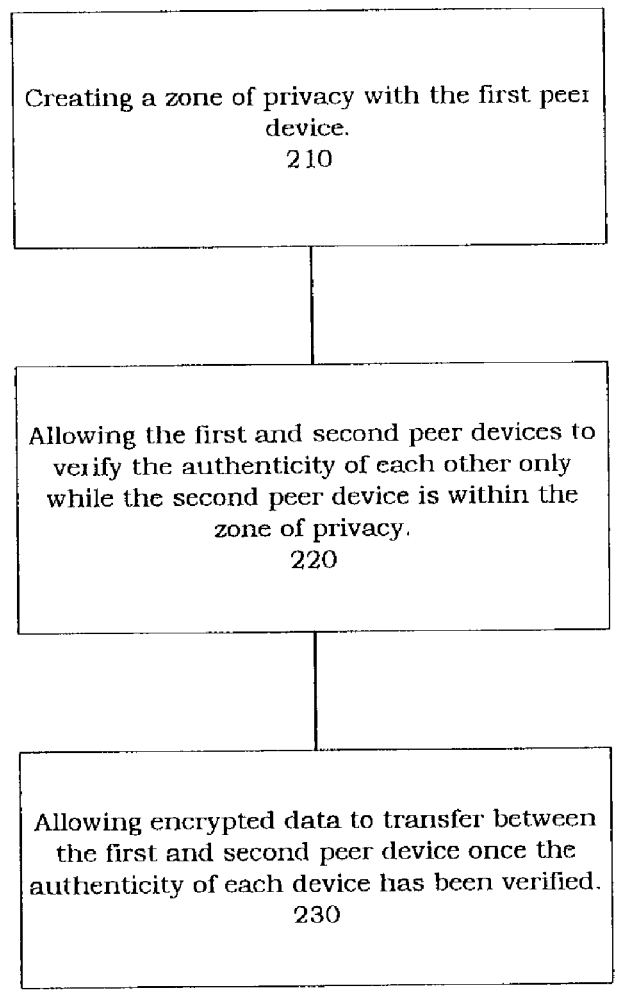
FIG. 2 is a high-level flowchart of a method in accordance with an embodiment of the present invention.

For a better understanding of the present invention, please refer now to FIG. 2. FIG. 2 is a high-level flowchart of the method for providing secure communications between a first peer device and a second peer device in accordance with an embodiment of the present invention. First, a zone of privacy is created with the first peer device, via step 210. In an embodiment, the zone of privacy is an area close (almost touching) to the first peer device. Next, the first and second peer devices are allowed to verify the authenticity of each other only while the second peer device is within the zone of privacy, via step 220. In an embodiment of the invention, the two devices verify the authenticity of each other utilizing a public-private key exchange Finally, the encrypted data is allowed to transfer between the first and second peer once the authenticity of each device has been verified, via step 230. Because the authenticity of the other peer device is verified only while the second device is within the zone of privacy, a user can visually confirm that there are no potential interlopers within the zone. As a result, the two peer devices are allowed to discover each other in a more secure fashion.

Figure 3:
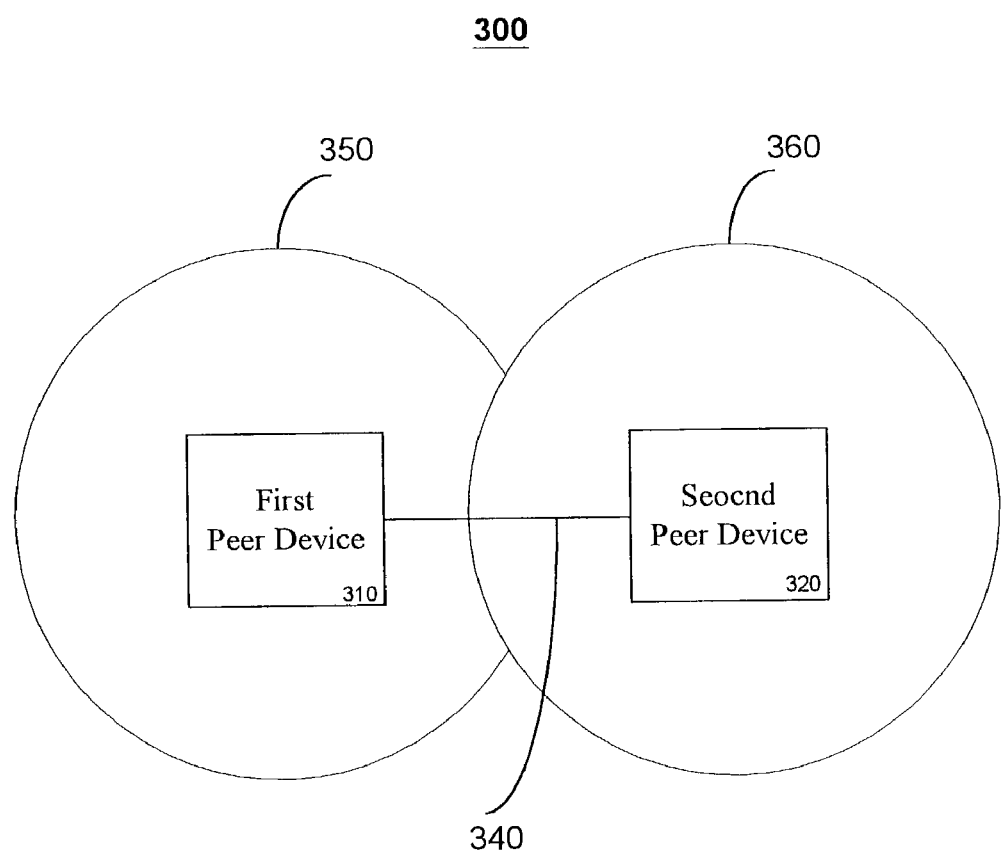
FIG. 3 shows an exemplary system in accordance with an embodiment of the present invention.

FIG. 3 shows an exemplary peer-to-peer communication system 300 in accordance with an embodiment of the present invention. The system 300 includes a first peer device 310 and a second peer device 320. The first and second peer devices 310, 320 respectively include a zone of privacy 350, 360. Each zone of privacy 350, 360 is established by operating a wireless communication link 340 at a sufficiently low power so that a wireless communication range for each peer device is restricted to a short, predetermined distance, for example, less than 20 centimeters. Because the communication range of each peer device is restricted to a short, predetermined distance, users can visually confirm that there are no potential interlopers within that distance.

Accordingly, it is only within these zones of privacy 350, 360 that the first and second peer devices 310, 320 are subsequently allowed to verify the authenticity of each other via the wireless link 340. In other words, it is only when the first peer device 310 resides in the zone of privacy 360 of the second peer device 320 and the second peer device 320 resides in the zone of privacy 350 of the first peer device 310 that the authenticity of each peer device is verified.

Figure 4:
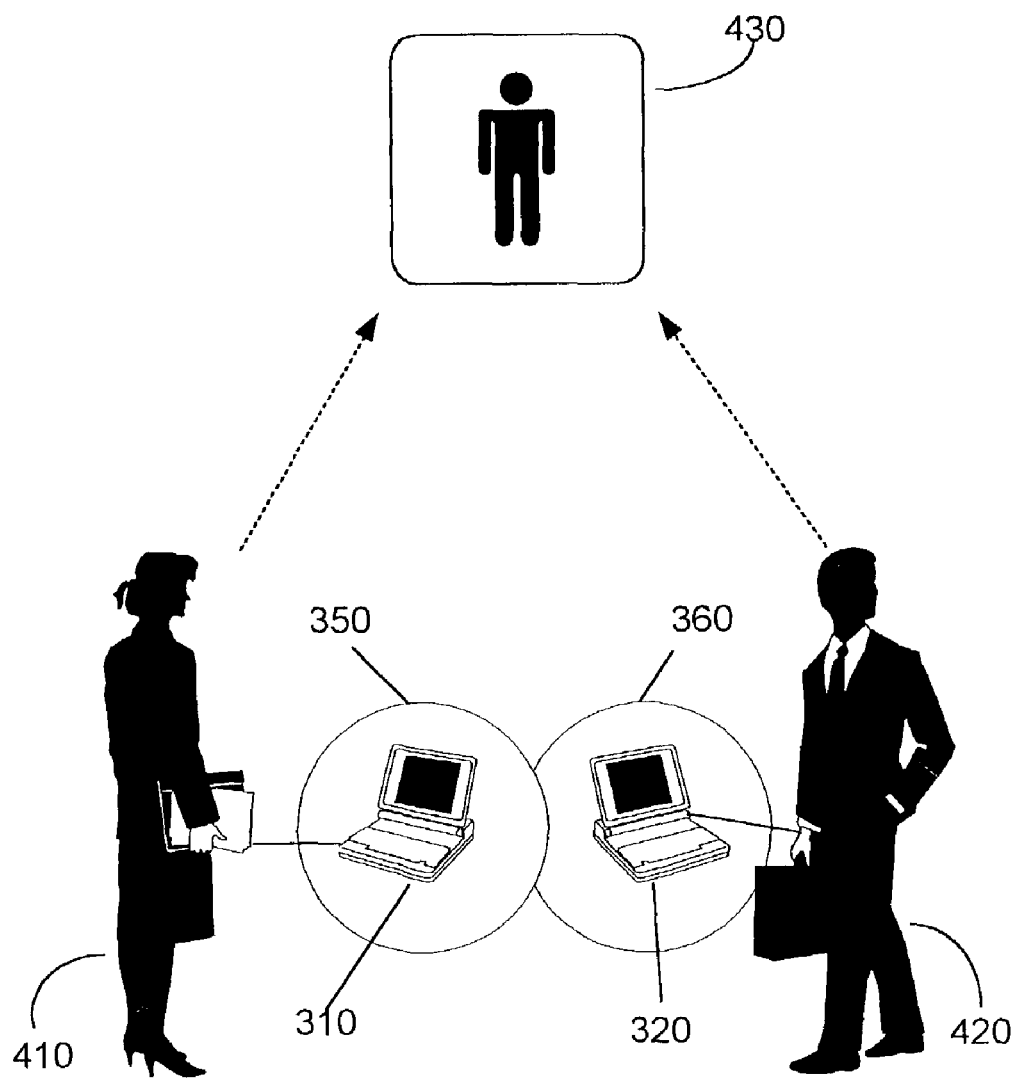
FIG. 4 shows a first user with the first peer device, a second user with the second peer device and a potential interloper in accordance with an embodiment of the present invention.

Those skilled in the art will appreciate that hand-held portable electronic devices share the characteristics of being physically small, lightweight, and include a self-contained power source such as a battery. Accordingly, extremely low power transmissions do not severely deplete the reserves of the small batteries typically used in portable devices For a better understanding of the present invention, please refer now to FIG. 4 FIG. 4 shows a first user 410 with the first peer device 310, a second user 420 with the second peer device 420 and a potential interloper 430. Also shown in FIG. 4 are the respective zones of privacy 350, 360 of the first and second peer devices 310, 320

As previously stated, it is only when the first peer device 310 resides in the zone of privacy 360 of the second peer device 320 and the second peer device 320 resides in the zone of privacy 350 of the first peer device 310 that the authenticity of each peer device can be verified. Accordingly, FIG. 4 shows the first peer device 310 residing in the zone of privacy 360 of the second peer device 320 and the second peer device 320 residing in the zone of privacy 350 of the first peer device 310. Since the authenticity of each peer device can be verified only when the first peer device 310 resides in the zone of privacy 360 of the second peer device 320 and the second peer device 320 resides in the zone of privacy 350 of the first peer device 310, both the first and second user 410 and 420 can visually confirm that the potential interloper 430 (or any associated listening device) is not within either zone of privacy. As a result, both the first and second user 410, 420 are assured that the subsequent key exchange is completed with each other as opposed to being completed with the potential interloper 430.

Figure 5:
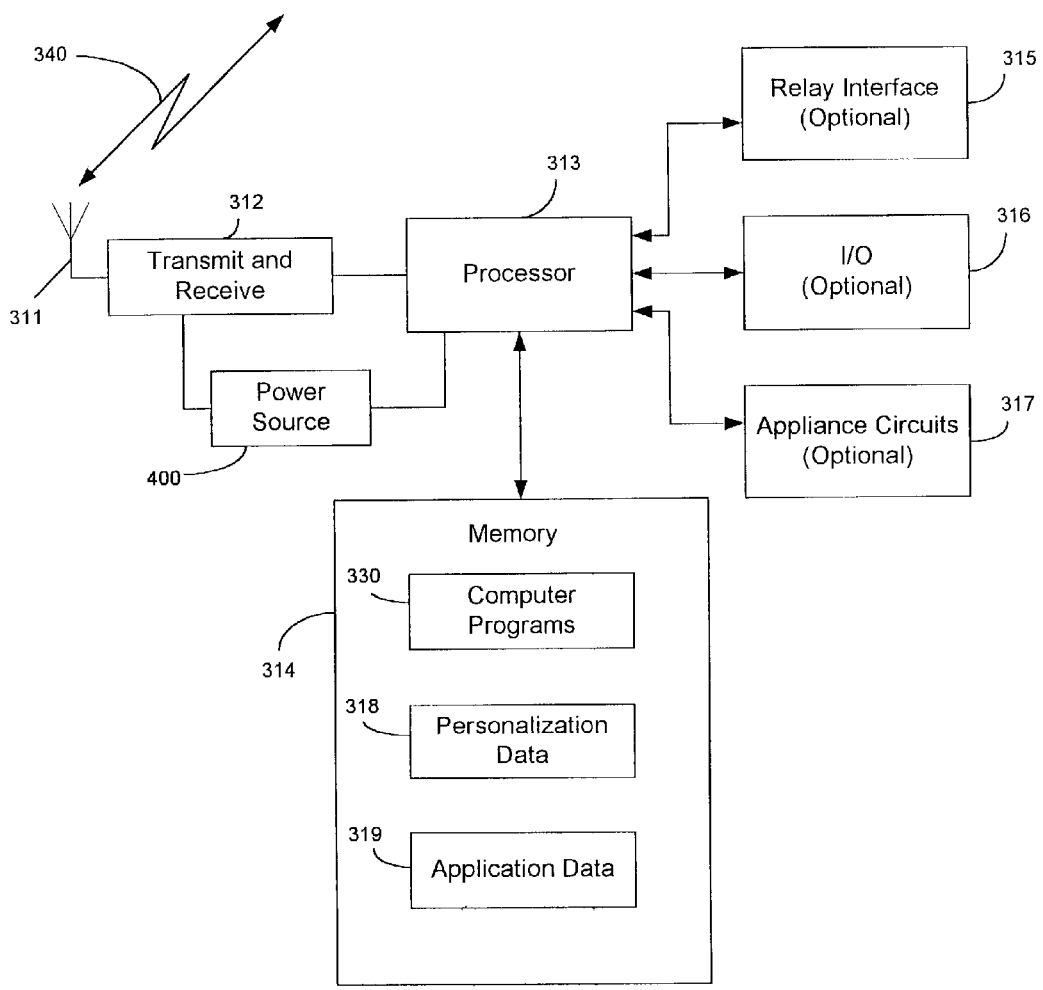
FIG. 5 shows a block diagram of hardware included in the first peer device in accordance with an embodiment of the present invention.

FIG. 5 shows a block diagram of hardware included in, for example, the first peer device 310. It should be understood that the second peer device 320 contains similar hardware. The first peer device 310 includes an antenna 311 configured to support wireless communication link 340. Antenna 311 couples to a transmit and receive section 312. Transmit and receive section 312 is compatible with the protocols that the first peer device 310 uses to communicate with the second peer device 320. An adjustable power source 400 couples to transmit and receive section 312 and to a processor 313. Processor 313 couples to a memory 314, an optional relay interface 315, an optional I/O section 316, and optional appliance circuits 317.

Processor 313 executes computer programs 330 which are stored in memory 314. Computer programs 330 define processes performed by processor 313. Processor 313 is capable of adjusting the power being supplied by the power source 400 to the transmit and receive section 312. By adjusting the power the supplied to the transmit and receive section 312, the processor 313 controls the communication range of the wireless link 340.

Memory 314 additionally stores personalization data 318 and application data 319. Personalization data 318 characterize a user or owner of the first peer device 310 and may change from user to user. ID codes, passwords, and PINS are examples of personalization data 318 as are radio or TV channel presets, language preferences, and speed dial telephone numbers. Application data 319 is provided by performing peer applications, and may change from moment to moment. A facsimile, a telephone number received over a pager, data scanned in using a bar code reader, and a sound snippet received from a microphone or other audio source represent examples of application data.

Figure 6:
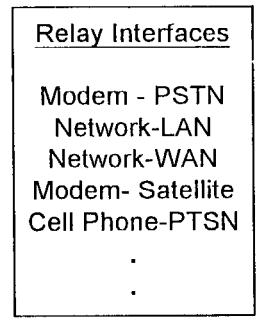
FIG. 6 shows a non-exhaustive list of relay interfaces which may be included in the first peer device in accordance with an embodiment of the present invention.

FIG. 6 shows a non-exhaustive list of relay interfaces 315 which may be included in the first peer device 310. Referring to FIGS. 5 and 6, relay interfaces 315 may be configured as any of a wide variety of relay, routing, or gateway devices known to those skilled in the art. For example, the relay interfaces 315 may couple the first peer device 310 to LANs or WANs.

Figure 7:
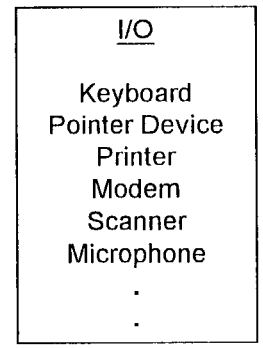
FIG. 7 shows a non-exhaustive list of I/O devices which may be included in the first peer device in accordance with an embodiment of the present invention.

FIG. 7 shows a non-exhaustive list of I/O devices 316 which may be included in the first peer device 310. Referring to FIGS. 5 and 7, I/O devices 316 may be classified into input devices and output devices. Input devices may include keyboards, pointing devices, optical scanners, microphones, and other well-known input devices. Output devices may include printers, monitors, speakers, and other well-known output devices.

Figure 8:
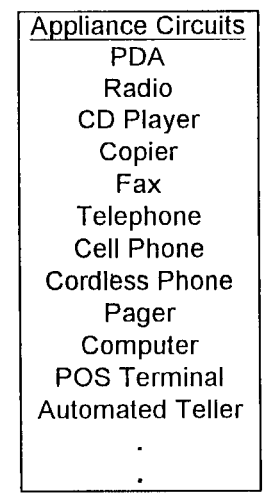
FIG. 8 shows a non-exhaustive list of examples of appliance circuits which may be included in the first peer device in accordance with an embodiment of the present invention.

FIG. 8 shows a non-exhaustive list of examples of appliance circuits 317 which may be included in the first peer device 310. Referring to FIGS. 5 and 8, appliance circuits 317 may be configured as any type of a wide variety of everyday, commonly encountered electronically controlled devices. Thus, the first peer device 310 may, be a smartcard, CD player, copier, facsimile machine, telephone, cellular telephone, cordless telephone, pager, computer, point-of-sale (POS) terminal, automated teller, or other electronic device.

Those skilled in the art will readily appreciate that relay interface section 315, I/O section 316 and appliance circuits 317 are not mutually exclusive categories. For example, many devices fall into multiple categories. For example, a computer considered as an appliance may include both an I/O section and a relay interface. Likewise, a relay interface may serve an I/O role.

It should also be noted that the peer device could include some type of auditory (a beep) or visual (a light) indication means that cues the user of the peer device when the peer device is within the zone of privacy of another peer device. For example, in an embodiment the peer device is configured whereby a light on the peer device is activated once the peer device enters the zone of privacy of another peer device. The light remains on while the devices verify the authenticity of each other and transfer encrypted data. Once the transfer is completed, the connection is terminated and the light goes off.

In an embodiment of the invention, the first and second peer devices 310, 320 (see FIG. 3) verify the authenticity of each other utilizing a public-private key exchange Asymmetric, or public key, procedures are those in which the communicating parties use mathematically related but different keys (e.g., a public encryption key and a private decryption key that cannot be feasibly derived from the public key) Symmetric encryption techniques such as DES, on the other hand, use the same key for both encryption and decryption.

There are several key patents and established protocols that could be utilized in conjunction with the present invention to effectuate this type of device verification. For example, the Diffie-Hellman key agreement protocol provides a procedure, using asymmetric encryption techniques, for establishing a secret session key between two parties, even though they share no secret information at the outset and communicate entirely over public channels. The procedure is described at page 649 of W. Diffie and M. E. Hellman, "New Directions in Cryptography", IEEE Transactions on Information Theory, vol. IT-22, no. 6, Nov. 1976, pp. 644-654, and in U.S. Pat. No. 4,200,770, both of which are incorporated herein by reference. Since, the base Diffie-Hellman procedure provides no inherent authentication, it is crucial that the key exchange take place "privately". In order to accomplish this, the aforementioned zones of privacy 350, 360 are subsequently utilized by the first and second peer devices 310, 320 to conduct the key exchange.

Although the present invention is disclosed in the context of being utilized in conjunction with the Diffie-Hellman key exchange protocol, one of ordinary skill in the art will readily recognize that any of a variety of different key exchange protocols could be employed while remaining within the spirit and scope of the present invention.

Once the authenticity of each device is verified, the first and second peer devices 310, 320 are allowed to transfer encrypted data between them via the wireless link 340. Because the authentication of each device has been securely verified within the respective zones of privacy, the level of power being utilized to generate wireless link 340 can be increased thereby allowing the first and/or second peer devices to be moved a reasonable distance (1-2 meters) from each other while the encrypted data is being transferred between them. The distance that the wireless link 340 operates can be increased at this point in the transaction since the data being transferred is encrypted and cannot be effectively utilized by a potential interloper.

Figure 9:
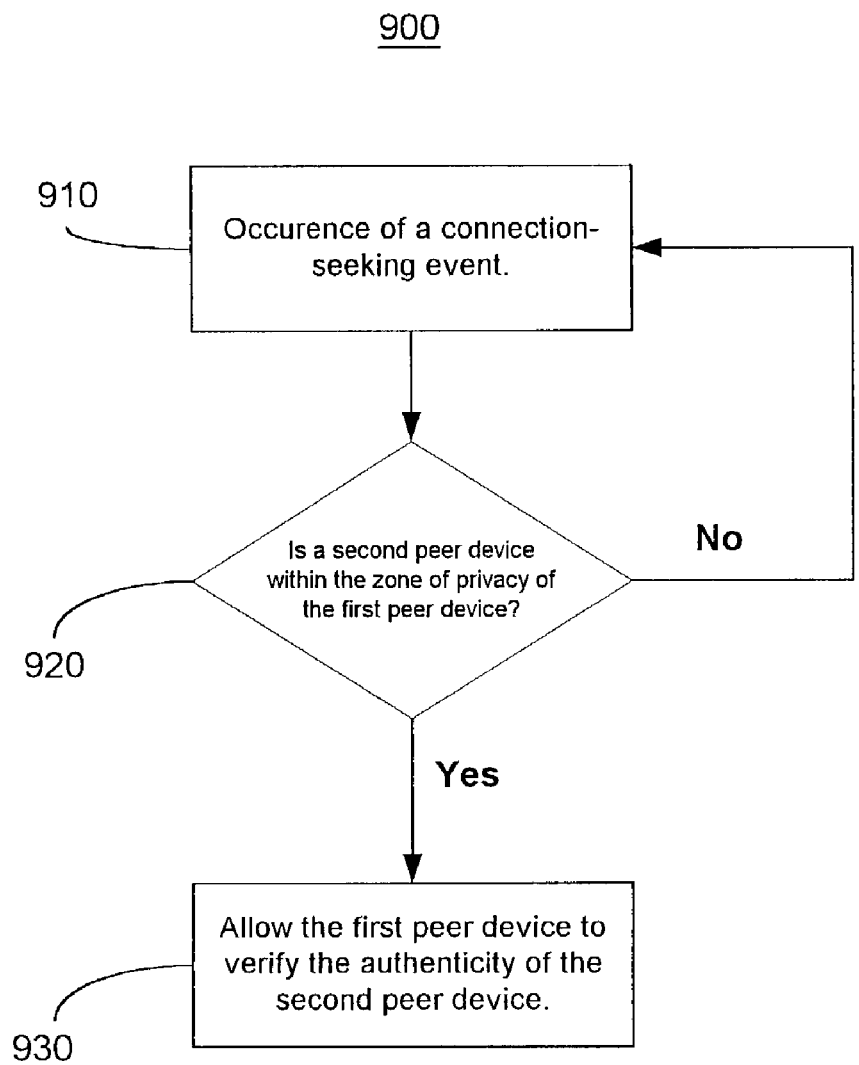
FIG. 9 shows a flow chart of steps included in a peer device verification process performed by the first peer device in accordance with an embodiment of the present invention.

For a better understanding of the present invention, please refer now to FIG. 9 in conjunction with FIGS. 3 and 5. FIG. 9 shows a flow chart of steps included in a peer device verification process 900 performed by the first peer device 310. Process 900 is defined by a computer program 330 stored in memory 314 of the first peer device 310 in a manner well-known to those skilled in the art. In an embodiment, the second peer device 320 performs a process similar to process 900.

Process 900 begins with the occurrence of a connection-seeking event, via step 910. A connection-seeking event causes the first peer device 310 to attempt to discover a second peer device. Connection-seeking events can be triggered using a periodic schedule. For example, connections may be sought out every few seconds. In this example, the schedule may call for more frequent periodic connection attempts from peers which are powered from a public power network and less frequent connection attempts from peers which are battery powered. Connection-seeking events can also be triggered upon the expiration of a timer or upon the receipt of other external information. The other external information can include information obtained through relay interface 315, I/O section 316, or appliance circuits 317 including user input.

Generally, step 910 causes transmit and receive section 312 to monitor the wireless communication link 340 to check whether the second peer device is within the established zone of privacy 350. Due to the above-described low transmission power levels used by the first peer device 310, the established zone of privacy 350 is an area close (within 20 cms) to the first peer device 310. Consequently, the second peer device will be detected only when the second peer device is within 20 cms of the first peer device 310.

Next, a determination is made as to whether a second peer device is within the zone of privacy of the first device, via step 920. If step 920 fails to determine that a second peer device is within the zone of privacy 350 of the first peer device 310, program control loops back to step 910. If step 920 determines that a second peer device is within the zone of privacy 350 of the first peer device 310, the first peer device 310 is allowed to verify the authenticity of the second peer device, via step 930.

Although the above-described embodiments are discussed in terms of both the first and second peer devices being mobile devices, it should be readily apparent to one of ordinary skill in the art that both peer devices do not have to be mobile. For example, the present invention could be employed to facilitate a customer/retail merchant relationship In such an example, the first peer device could be a mobile device such as a PDA or the like and the second peer device could be a point-of-sale (POS) terminal such as a cash register or the like.

Figure 10:
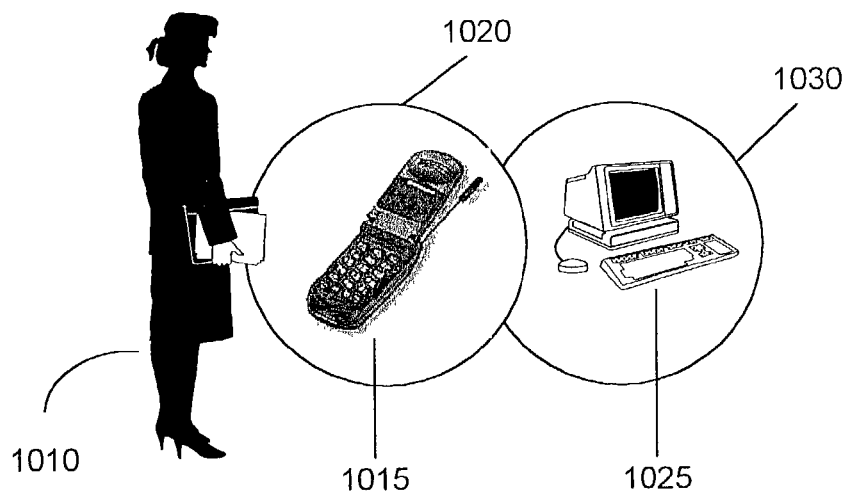
FIG. 10 shows a system in accordance with an alternate embodiment of the present invention.

FIG. 10 is an illustration of an alternate embodiment of the present invention.

FIG. 10 shows a customer 1010 with a mobile device 1015 and a POS terminal 1025 wherein the POS terminal 1025 is associated with a retailer of goods. The mobile device 1015 includes an associated zone of privacy 1020 and the POS terminal 1025 includes an associated zone of privacy 1030. Each zone of privacy 1020, 1030 is respectively established by operating a wireless communication link at a sufficiently low power so that a wireless communication range for each device is limited to being less than 20 centimeters. In this embodiment, it is assumed that the mobile device 1015 and the POS terminal 1025 are capable of communicating in a peer-to-peer fashion.

In accordance with the present invention, the authenticity of the mobile device 1015 can be verified by the POS terminal 1025 only when the mobile device 1015 resides in the zone of privacy 1030 of the POS terminal 1025. Consequently, the customer 1010 must bring the mobile device 1015 into the zone of privacy 1030 of the POS terminal 1025 Once the mobile device 1015 and the POS terminal 1025 verify the authenticity of each other (i.e. exchange public-private keys), the level of power being utilized by the mobile device 1015 to generate the link between the mobile device 1015 and the POS terminal 1025 is increased. This allows the mobile device 1015 to be moved a reasonable distance from the POS terminal 1025 while data related to retail purchases is subsequently entered into the mobile device 1015, encrypted, and then transferred to the POS terminal 1025.

For instance, let us assume that the customer 1010 enters a music store and wishes to purchase compact discs, digital video discs, or the like. In this case, the customer 1010 takes his mobile device 1015 and brings it within the zone of privacy 1030 of the POS terminal 1025 while making sure there are no potential interlopers in the vicinity. The POS terminal 1025 discovers the mobile device 1015 and a key exchange takes place between the two devices. Once the key exchange takes place, a visual cue on the mobile device 1015 is activated thereby letting the customer know that the key exchange has taken place. Now, the level of power being utilized by the mobile device 1015 to generate the link between the mobile device 1015 and the POS terminal 1025 is increased.

The customer 1010 can now move throughout the store and enter data into the mobile device 1015 related to the products that he wishes to purchase. This could involve the customer manually entering product information into the mobile device 1015 or using an Infra-Red scanning device coupled to the mobile device 1015 to read bar-coded product information. The entered data is then encrypted and transferred to the POS terminal 1025. Once the customer has finished selecting his desired products, the customer inputs his credit/atm card data into the mobile device 1015. This data is then encrypted and transferred to the POS terminal 1025. Once the transaction is approved, the POS terminal 1025 transmits (in an encrypted fashion) a receipt of the purchase to the mobile device 1015 and the connection between the two devices is terminated. Once the connection is terminated, the visual cue on the mobile device 1015 is terminated as well. In order to conduct another transaction, the customer must re-initiate the process with the POS terminal 1025

Figure 11:
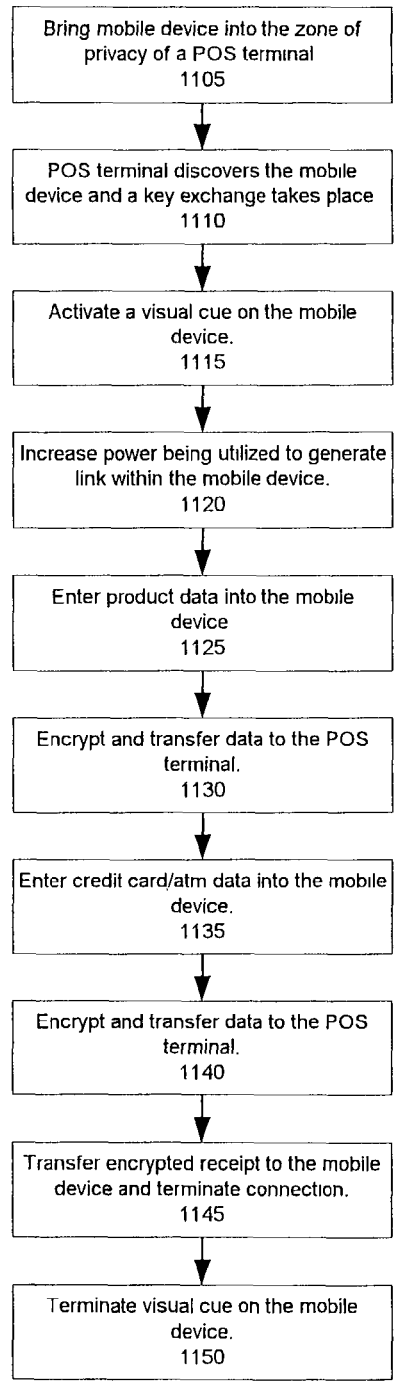
FIG. 11 is a flowchart of a method in accordance with an alternate embodiment of the present invention.

For a better understanding of the above-described embodiment of the present invention, please refer now to FIG. 11. FIG. 11 is a flowchart of a method in accordance with an alternate embodiment of the present invention. First, a customer brings a mobile device within the zone of privacy of a POS terminal, via step 1105. Next, the POS terminal discovers the mobile device and a key exchange takes place, via step 1110. A visual cue on the mobile device is then activated, via step 1115. Next, the level of power being utilized by the mobile device to generate the link between the mobile device and the POS terminal is increased, via step 1120.

The customer then enters product data into the mobile device, via step 1125 This data is then encrypted and transferred to the POS terminal, via step 1130. Next, the customer enters credit card/atm data into the mobile device, via step 1135. This data is then encrypted and transferred to the POS terminal, via step 1140. An encrypted receipt is then transferred to the mobile device and the connection between the two devices is terminated, via step 1145. Finally, the visual cue on the mobile device is terminated, via step 1150.

Additionally, in accordance with an embodiment of the present invention, the communication link 340 (see FIG. 3) is a radio link in accordance with the BLUETOOTH® Global Specification for wireless connectivity. BLUETOOTH® is an open standard for short range transmission of digital voice and data between mobile devices (laptops, PDAs, phones) and desktop devices. It supports point-to-point and multipoint applications. Unlike Infra-Red, which requires that devices be aimed at each other (line-of-sight), BLUETOOTH® uses omni-directional radio waves that can transmit through walls and other non-metal barriers. BLUETOOTH® transmits in the unlicensed 2.4 GHz band and uses a frequency hopping spread spectrum technique that changes its signal 1600 times per second. If there is interference from other devices, the transmission does not stop, but its speed is downgraded The BLUETOOTH® baseband protocol is a combination of circuit and packet switching. Each data packet is transmitted in a different hop frequency wherein the maximum frequency hopping rate is 1600 hops/s. BLUETOOTH® can support an asynchronous data channel, up to three simultaneous synchronous voice channels, or a channel which simultaneously supports asynchronous data and synchronous voice. Each voice channel supports 64 kb/s synchronous (voice) link. The asynchronous channel can support a symmetric link of maximally 721 kb/s in either direction while permitting 57.6 kb/s in the return direction, or a 432.6 kb/s symmetric link.

The BLUETOOTH® air interface is based on a nominal antenna power. Spectrum spreading has been added to facilitate optional operation at power levels up to 100 mW worldwide. Spectrum spreading is accomplished by frequency hopping in 79 hops displaced by 1 MHz, starting at 2.402 GHz and stopping at 2.480 GHz. The nominal link range is 10 centimeters to 10 meters, but can be extended to more than 100 meters by increasing the transmit power.

The invention may be implemented, for example, by operating a digital processor to execute a sequence of machine-readable instructions. The instructions may reside in various types of computer readable media. In this respect, another aspect of the present invention concerns a programmed product, comprising computer readable media tangibly embodying a program of machine readable instructions executable by a digital data processor to perform the method in accordance with an embodiment of the present invention.

This computer readable media may comprise, for example, RAM (not shown) contained within the system. Alternatively, the instructions may be contained in another computer readable media such as a magnetic data storage diskette and directly or indirectly accessed by the computer system. Whether contained in the computer system or elsewhere, the instructions may be stored on a variety of machine readable storage media, such as a DASD storage (for example, a conventional "hard drive" or a RAID array), magnetic tape, electronic read-only memory, an optical storage device (for example, CD ROM, WORM, DVD, digital optical tape), paper "punch" cards, or other suitable computer readable media including transmission media such as digital, analog, and wireless communication links. In an illustrative embodiment of the invention, the machine-readable instructions may comprise lines of compiled C, C++, or similar language code commonly used by those skilled in the programming for this type of application arts.

A method and system for providing secure communications between a first and second peer device is disclosed. The invention includes allowing the first and second peer devices to verify the authenticity of each other only while each peer device is within an established zone of privacy wherein the established zone of privacy is an area close to the peer device. Because the authenticity of the other device is verified only while each peer device is within the established zone of privacy, users can visually confirm that there are no potential interlopers within the zone. As a result, the two peer devices can discover each other in a more secure fashion.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims

What is claimed is:

1. A method for providing secure communications between first and second peer devices, comprising:
   generating a wireless link from the first peer device;
   creating a zone of privacy with the first peer device that is defined by restricting a range of the wireless link to a predetermined communication range that is less than a second communication range used for transferring data to the second peer device on the wireless link after the first and second peer devices verify an authenticity of each other,
   wherein restricting a range of the wireless link comprises operating a power source, wherein the power source is associated with the wireless link, at a sufficiently low power whereby the range of the wireless link is limited to the predetermined communication range;
   allowing the first and second peer devices to verify the authenticity of each other only while the second peer device is within the zone of privacy, and activating a cue, wherein the cue is an indicator on the first peer device that provides an indication to a user, and the cue is activated only when the second peer device enters the zone of privacy; and
   allowing encrypted data to transfer between the first and second peer devices only after the authenticity of each peer device has been verified, wherein the encrypted data transfer includes the first peer device transmitting at least some of the encrypted data to the second peer device on the wireless link in the second communication range greater than the predetermined communication range.

2. The method of claim 1 wherein the act of allowing the two peer devices to verify the authenticity of each other further comprises:
   creating a second zone of privacy with the second peer device; and
   allowing the first and second peer devices to verify the authenticity of each other only when the first peer device resides in the second zone of privacy and the second peer device resides in the zone of privacy of the first peer device.

3. The method of claim 1 wherein the predetermined communication range is less than 20 centimeters.

4. The method of claim 1 wherein the act of allowing encrypted data to transfer between the first and second peer device further comprises:
   increasing the power being utilized to generate the wireless link thereby enabling the first peer device to be moved beyond the predetermined communication range while the first and second peer devices are transferring encrypted data between them.

5. The method of claim 2 wherein the first and second peer devices verify the authenticity of each other by utilizing a public-private key exchange.

6. The method of claim 5 wherein the public-private key exchange comprises a Diffie-Hellman key exchange.

7. The method of claim 1, wherein the cue remains activated during the authenticity verification of the peer devices and during the encrypted data transfer, and wherein the cue is deactivated when the encrypted data transfer is completed.

8. A peer device comprising:
   a processor; and
   a memory storing machine readable instructions, which when executed by the processor, cause the peer device to perform a method comprising:
   generating a wireless link from the peer device;
   creating a zone of privacy that is defined by restricting a range of the wireless link to a predetermined communication range and allowing the peer device to verify the authenticity of another peer device only while the another peer device is within the zone of privacy,
   wherein restricting a range of the wireless link comprises operating a power source, wherein the power source is associated with the wireless link, at a sufficiently low power whereby the range of the wireless link is limited to the predetermined communication range;
   activating a cue, wherein the cue is an indicator on the peer device that provides an indication to a user, wherein the cue is activated only when the another peer device enters the zone of privacy; and
   transferring encrypted data to the another peer device only after the authenticity of the another peer device has been verified.

9. The peer device of claim 8 wherein allowing the peer device to verify the authenticity of the another peer device further comprises:
   allowing the peer device to verify the authenticity of the another peer device only when the peer device resides in another zone of privacy and the another peer device resides in the zone of privacy of the peer device wherein the another zone of privacy is created by the another peer device.

10. The peer device of claim 8, wherein the predetermined communication range is less than 20 centimeters.

11. The peer device of claim 8, wherein transferring encrypted data to the another peer device further comprises: increasing the power being utilized to generate the wireless link thereby enabling the peer device to be moved beyond the predetermined communication range while the peer device transfers encrypted data to the another peer device.

12. The peer device of claim 9 wherein the authenticity of the another peer device is verified by utilizing a public-private key exchange.

13. The peer device of claim 12 wherein the public-private key exchange comprises a Diffie-Hellman key exchange.

14. The peer device of claim 8, wherein the cue remains activated during the authenticity verification of the peer devices and during the encrypted data transfer, and wherein the cue is deactivated when the encrypted data transfer is completed.

15. A system for providing secure communications between two peer devices, the system comprising: first and second peer devices wherein the first and second peer devices each comprise:
a processor; and
a memory storing machine readable instructions, which when executed by the processor, cause the peer device to perform a method comprising:
generating a wireless link;
creating a zone of privacy that is defined by restricting a range of the wireless link to a predetermined communication range and allow the peer device to verify the authenticity of another peer device only while the another peer device is within the zone of privacy,
wherein restricting a range of the wireless link comprises operating a power source, wherein the power source is associated with the wireless link, at a sufficiently low power whereby the range of the wireless link is limited to the predetermined communication range;
activating a cue, wherein the cue is an indicator on the peer device that provides an indication to a user, wherein the cue is activated only when the another peer device enters the zone of privacy; and
transferring encrypted data to the another peer device only after the authenticity of the another peer device has been verified.

16. The system of claim 15 wherein allowing the peer device to verify the authenticity of the another peer device further comprises:
allowing the peer device to verify the authenticity of the another peer device only when the peer device resides in another zone of privacy and the another peer device resides in the zone of privacy of the peer device, wherein the another zone of privacy is created by the another peer device.

17. The system of claim 15, wherein the predetermined communication range is less than 20 centimeters.

18. The system of claim 15, wherein transferring encrypted data to the another peer device further comprises:
increasing the power being utilized to generate the wireless link thereby enabling the peer device to be moved beyond the predetermined communication range while the peer device transfers encrypted data to the another peer device.

19. The system of claim 16 wherein the authenticity of the another peer device is verified by utilizing a public-private key exchange.

20. The system of claim 19 wherein the public-private key exchange comprises a Diffie-Hellman key exchange.

21. The system of claim 15, wherein the cue remains activated during the authenticity verification of the peer devices and during the encrypted data transfer, and wherein the cue is deactivated when the encrypted data transfer is completed.

22. A non-transitory computer program product for providing secure communications between first and second peer devices, the computer program product comprising: a computer readable program stored on a computer readable storage device for causing a computer to perform the steps of:
generating a wireless link from the first peer device;
creating a zone of privacy with the first peer device that is defined by restricting a range of the wireless link to a predetermined communication range,
wherein restricting a range of the wireless link comprises operating a power source, wherein the power source is associated with the wireless link, at a sufficiently low power whereby the range of the wireless link is limited to the predetermined communication range;
allowing the first and second peer devices to verify the authenticity of each other only while the second peer device is within the zone of privacy;
activating a cue, wherein the cue is an indicator on the first peer device that provides an indication to a user, wherein the cue is activated only when the second peer device enters the zone of privacy; and
allowing encrypted data to transfer between the first and second peer devices only after the authenticity of each peer device has been verified.

23. The computer program product of claim 22 wherein the act of allowing the two peer devices to verify the authenticity of each other further comprises:
creating a second zone of privacy with the second peer device; and
allowing the first and second peer devices to verify the authenticity of each other only when the first peer device resides in the second zone of privacy and the second peer device resides in the zone of privacy of the first peer device.

24. The computer program product of claim 22 wherein the predetermined communication range is less than 20 centimeters.

25. The computer program product of claim 22, wherein the cue remains activated during the authenticity verification of the peer devices and during the encrypted data transfer, and wherein the cue is deactivated when the encrypted data transfer is completed.

26. A method for conducting a secure business transaction between a first and a second peer device comprising:
generating a wireless link from the first peer device;
creating a zone of privacy with the first peer device that is defined by restricting a range of the wireless link to a predetermined communication range,
wherein restricting a range of the wireless link comprises operating a power source, wherein the power source is associated with the wireless link, at a sufficiently low power whereby the range of the wireless link is limited to the predetermined communication range; allowing the first and second peer devices to verify the authenticity of each other only while the second peer device is within the zone of privacy;
activating a cue, wherein the cue is an indicator on the first peer device that provides an indication to a user, wherein the cue is activated only when the second peer device enters the zone of privacy; and allowing encrypted data to transfer between the first and second peer devices only after the authenticity of each peer device has been verified.

27. The method of claim 26 wherein the first device comprises a mobile device and the second device comprises a point-of-sale terminal.

28. The method of claim 26, wherein the cue remains activated during the authenticity verification of the peer devices and during the encrypted data transfer, and wherein the cue is deactivated when the encrypted data transfer is completed.

* * * * *

UNITED STATES PATENT AND TRADEMARK OFFICE
CERTIFICATE OF CORRECTION

PATENT NO. : 8,271,786 B1  
APPLICATION NO. : 10/271662  
DATED : September 18, 2012  
INVENTOR(S) : Salil Vjaykumar Pradhan et al.

Page 1 of 1

It is certified that error appears in the above-identified patent and that said Letters Patent is hereby corrected as shown below:

In column 10, line 17, in Claim 3, delete "claim 1" and insert -- claim 1, --, therefor.

In column 10, line 20, in Claim 4, delete "claim 1" and insert -- claim 1, --, therefor.

In column 12, line 44, in Claim 24, delete "claim 22" and insert -- claim 22, --, therefor.

Signed and Sealed this
Nineteenth Day of March, 2013

Teresa Stanek Rea
*Acting Director of the United States Patent and Trademark Office*